Nov. 10, 1925.   1,560,599
C. C. MOLER
SLIDE RULE
Filed July 18, 1925
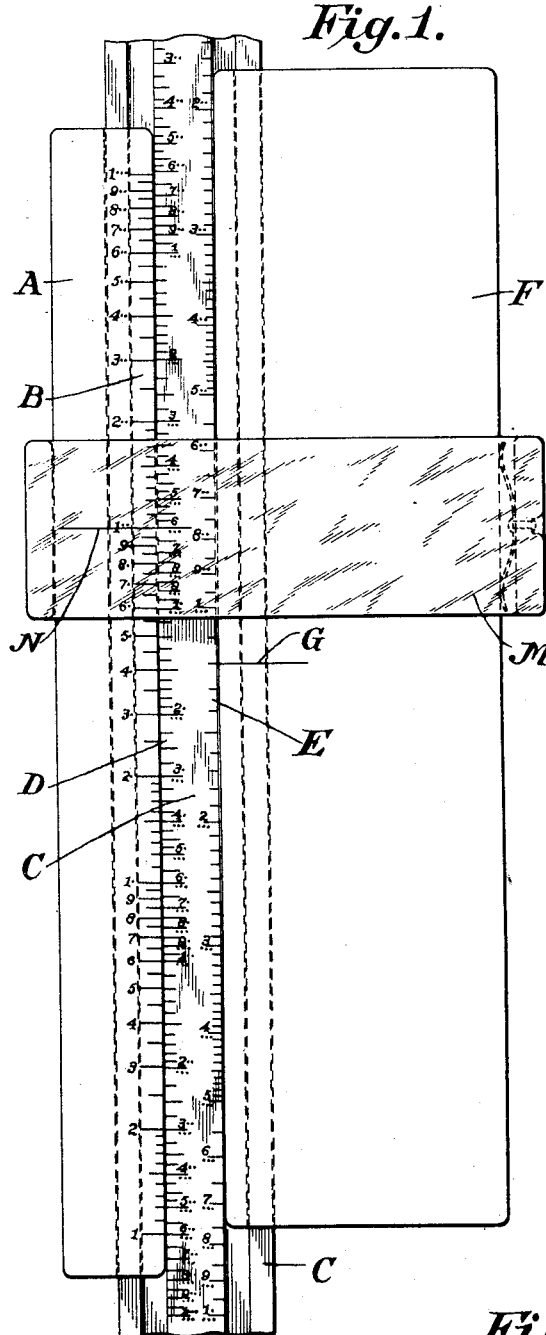
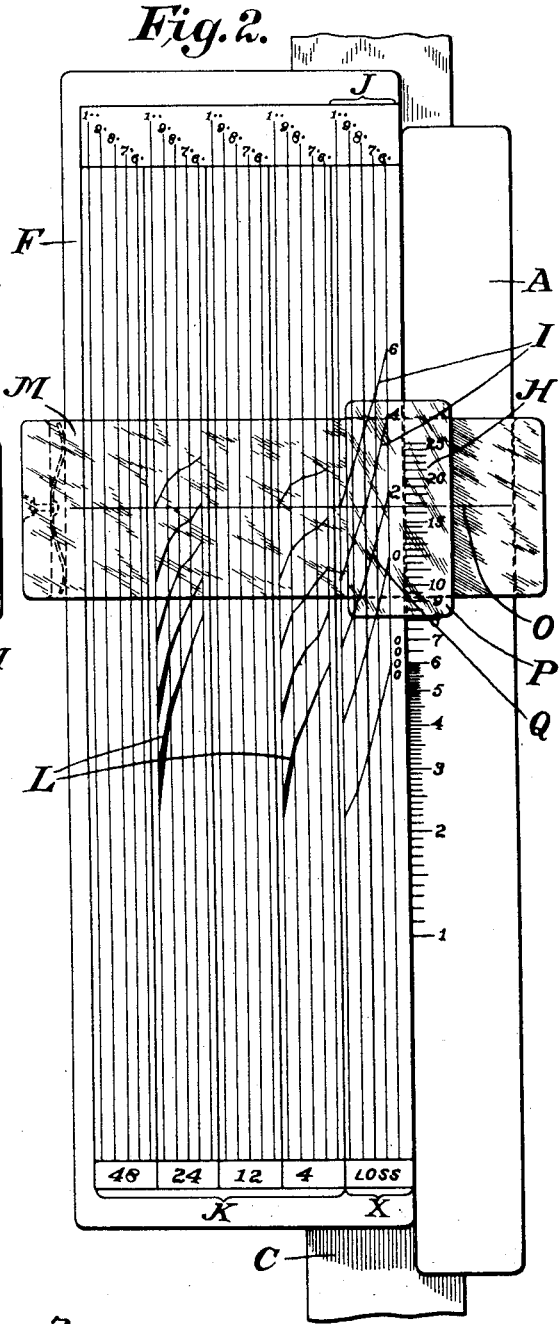
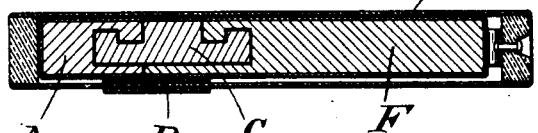
Inventor:
Charles C. Moler,
by Spear, Middleton, Donaldson, Hall
Attys.

Patented Nov. 10, 1925.

1,560,599

UNITED STATES PATENT OFFICE.

CHARLES C. MOLER, OF HAGERSTOWN, MARYLAND.

SLIDE RULE.

Application filed July 18, 1925. Serial No. 44,599.

*To all whom it may concern:*

Be it known that I, CHARLES C. MOLER, a citizen of the United States, and resident of Hagerstown, in the county of Washington and State of Maryland, have invented certain new and useful Improvements in Slide Rules, of which the following is a specification.

My present invention relates to a calculating device commonly known as a slide rule, and the particular problem to be solved is the calculation of the loss of power and voltage as occurring in an electric wire line, taking into consideration the variables usually occurring.

The principal object of the invention is the provision of a device which will accurately, quickly, and without either long hand figuring or consultation with other tables or charts, calculate the loss in power and voltage as above described.

To this end my invention includes four logarithmic scales and a scale of wire sizes and a number of sets of curves. These scales are suitably arranged upon elements slidable in relation to each other in order that the proper calculation may be made.

Specifically the invention contemplates structurally the provision of three slides secured to each other by dove-tailing or other frictional engagement, two of said slides having scales on each side thereof, the third slide having scales on one face thereof only. Embracing the three slides I provide a transparent indicator having a hair line on each side thereof, one side of said indicator having mounted thereon a second or supplemental indicator capable of longitudinal movement on the first mentioned indicator and provided with a hair line at right angles to the hair line of the main indicator.

The invention further consists in the arrangement, combination and structure of the parts hereinafter shown and described.

I have illustrated in the accompanying drawings one form of carrying out the invention, although obviously I do not wish to be limited thereto, as it simply illustrates the principle involved.

In these drawings:—

Figure 1 is a plan view of one face of the slide rule.

Fig. 2 is a plan view of the reverse face thereof.

Fig. 3 is a sectional elevation showing the details of structure.

In adapting the structure above described to the particular problem mentioned, I make use of a slide A which carries a logarithmic scale indicated at B, which scale reads in kilowatts. The particular extent of the scale is optional and may be varied according to the circumstances under which the calculator is to be used.

A slide C dove-tailed or otherwise frictionally engaging the slide A carries thereon a scale D adjacent to the scale B. Scale D reads in distance, the divisions of scale D being of the same relative spacing as scale B, but reading in the reverse direction.

Also contained upon the slide C is a scale E opposite scale D, reading in volts. Obviously scales E and D are fixed with relationship to each other. The divisions of scale E are double the relative spacing of scale D and read in the same direction.

Slide F frictionally engaged by slide C, and movable in relation thereto, carries a pointer G for a purpose to be more fully described hereinafter.

On the reverse side of slide A, I provide a scale H which reads in percentage. It is on the scale H that the answer to the problem is found. Inasmuch as the scales H and B are located on the slide A, they are fixed as to each other. The divisions of scale H are of the same relative spacing as scale B and read in the same direction.

On the reverse side of slide F, I provide a scale of wire sizes I, which scale takes the form of curves, each curve corresponding to a single wire size. The scale I is adjacent the scale H and reads from small wire to larger, or in a reverse direction from that of scale H. Cutting the curves I are lines J which indicate the power factor of the load. The scales I and J are used to determine the power loss.

On the same side of the slide F I provide a set of scale lines representing different spacing in inches between the wires. These are indicated at K, each spacing having its own curve L cutting lines K indicating the power factor of the load. Scales K and L are used to determine voltage drop or loss.

It will be noted that certain sections of certain curves as used with the scale K are made wider than a line, the use of which will be explained more fully hereinafter.

Embracing the three slides is a main indicator M having a hair line N on that side of the device occupied by the pointer G, and a hair line O on the opposite side thereof. On this same side of the device a supplemental indicator P is mounted upon the indicator M and movable thereon, the supplemental indicator being provided with a hair line Q at right angles to the hair line O.

The operation of the device in the solution of a particular problem is as follows:—

To determine the loss in percentage of power delivered and voltage delivered, read the load delivered in kilowatts on scale B and adjust that point to coincide with the proper distance on scale D.

Adjust the scale E representing volts delivered so that the desired point will coincide with the pointer G, which pointer is fixed with relationship to the scale of wire sizes I on the reverse side of the slide F. Now move the indicator M until its hair line N covers the desired coinciding divisions in the scales B and D, and turn the slide over.

For loss in per cent of delivered power, move the supplemental indicator P on the main indicator M into the loss column X and then adjust to the subdivision representing the power factor of the load as indicated on the scale J. Then move the main indicator M until the point of intersection of the hair line O on the indicator M and the hair line Q on the indicator P intersects the curve for the proper wire size. Then read the percentage on the scale H indicated by the hair line O on the main indicator M. This will indicate the percentage of loss in power.

To determine the loss in per cent of delivered voltage, using the same variables as above described, move the supplemental indicator P to the column of curves for the given wire spacing indicated at K and then to the proper subdivision of power factor, as indicated on that particular spacing. Then move the main indicator M to the curve for the proper wire size.

If the section of the curve used is wider than a line, as above described, glance at scale H and notice approximately where the result will be read. If this point is a low figure, adjust the point of the hair lines at a relatively low point with reference to the width of the curve, or vice versa, as the case may be. Then read the percentage as before on the scale H.

Obviously if the power loss or voltage loss is known and some other factor is required, it can be found by making a corresponding change in the order of operation.

As illustrative of the solving of a problem in which the variables are specified, I proceed as follows, using the rule in the position shown in Figs. 1 and 2:—

The rule is adjusted to one hundred kilowatts transmitted over a distance of six thousand feet by making 100 on scale B coincide with 6000 on scale D. The pointer G is then adjusted in relation to scale E to indicate twelve hundred volts being transmitted and the indicator M moved until its hair line N covers the 100 point on scale B and the 6000 point on scale D. The rule is then turned over and in calculating the loss of power, the supplemental indicator P is adjusted until its hair line coincides with the proper scale line on the scale J, which I will say in this instance is indicated by the power factor 80. The main indicator M is then adjusted until its hair line O intersects the proper wire size, which I will take in this case as #4. The hair line on the main indicator M then indicates on the scale H reading in percentage, the loss in power, which I find to be nearly 17%.

The same process of adjustment of the indicators is used in the calculation of voltage loss, using scales K and L, the final reading being taken on the percentage scale, as in the last instance.

Obviously the percentage scale may be varied to take care of other circumstances, the particular scale indicated being that as used for three-phase sixty-cycle current.

Having thus described my invention, what I claim is:—

1. A slide rule comprising a slide having on one face thereof a scale a second scale on said slide, a second slide frictionally engaging the first mentioned slide and having on one face thereof a scale, adjacent the first scale on the first mentioned slide, and a second scale on the second mentioned slide adjacent a pointer on a third slide, said second slide frictionally engaging the third mentioned slide, the latter slide having a scale thereon, an indicator embracing the three slides and having a hair line on each face of the rule, and a second indicator slidable on the first indicator, and having a hair line at right angles to the hair line of the first indicator.

2. A slide rule comprising a slide having on one face thereof a scale and on the reverse face a scale a second slide frictionally engaging the first mentioned slide, and having on one face thereof a scale adjacent the first scale on the first mentioned slide, and a second scale on the second mentioned slide adjacent a pointer on a third slide, said second slide frictionally engaging the third mentioned slide, the latter slide having on its reverse face a plurality of scales an indicator embracing the three slides and having a hair line on each face of the rule, and a second indicator slidable on the first indicator, and having a hair line at right angles to the hair line of the first indicator.

3. A slide rule comprising a slide having on one face thereof a scale representing kilowatts a second scale on said slide representing percentage, a second slide frictionally engaging the first mentioned slide and having on one face thereof a scale representing distance adjacent the kilowatt scale on the first mentioned slide, and a second scale on the second mentioned slide indicating volts adjacent a pointer on a third slide, said second slide frictionally engaging the third mentioned slide, the latter slide having thereon scales representing wire sizes and wire spacings, the scales representing wire sizes and wire spacings being intersected by scales representing the power factor of the load, an indicator embracing the three slides and having a hair line on each face of the rule, and a second indicator slidable on the first indicator, and having a hair line at right angles to the hair line of the first indicator whereby when a value on the first slide representing kilowatts is set to a value on the second slide representing distance, and a value on the second slide representing volts is set opposite the pointer on the third slide, and a hair line of the first indicator is adjusted to the coinciding values representing kilowatts and distances, on reversal of the slide rule, the hair line on the second indicator being moved to a value on the reverse side of the third mentioned slide, and the first indicator being moved so that the intersection of its reverse hair line and that of the second indicator indicates a value on the third mentioned slide, the reverse hair line of the first indicator indicates a value on the reverse side of the first mentioned side representing a percentage.

In testimony whereof, I affix my signature.

CHARLES C. MOLER.